(12) United States Patent
Byun et al.

(10) Patent No.: US 10,209,662 B2
(45) Date of Patent: Feb. 19, 2019

(54) SCANNER APPARATUS, IMAGE FORMING APPARATUS EMPLOYING THE SAME, AND SKEW CORRECTION METHOD

(71) Applicant: S-PRINTING SOLUTION CO., LTD., Suwon-si, Gyeonggi-do (KR)

(72) Inventors: Ji-young Byun, Suwon-si (KR); Sung-dae Kim, Suwon-si (KR); Young-jung Yun, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 38 days.

(21) Appl. No.: 15/392,062

(22) Filed: Dec. 28, 2016

(65) Prior Publication Data

US 2017/0192383 A1  Jul. 6, 2017

(30) Foreign Application Priority Data

Jan. 6, 2016 (KR) .................. 10-2016-0001609

(51) Int. Cl.
*H04N 1/00* (2006.01)
*G03G 15/00* (2006.01)

(52) U.S. Cl.
CPC ..... *G03G 15/6561* (2013.01); *G03G 15/6567* (2013.01); *H04N 1/00* (2013.01)

(58) Field of Classification Search
CPC .......... G03G 15/6564; G03G 15/6561; G03G 15/6558; G03G 15/6567; H04N 1/00
See application file for complete search history.

(56) References Cited

U.S. PATENT DOCUMENTS

| | | | | |
|---|---|---|---|---|
| 5,278,624 A | * | 1/1994 | Kamprath | B65H 9/002 399/395 |
| 5,969,844 A | * | 10/1999 | Itami | G02B 26/121 359/198.1 |
| 6,281,609 B1 | * | 8/2001 | Itami | G02B 26/121 310/179 |
| 6,928,929 B1 | * | 8/2005 | McNeil | B26D 5/32 101/226 |
| 8,348,266 B2 | | 1/2013 | Deno | |
| 2003/0020230 A1 | * | 1/2003 | Williams | B65H 9/002 271/227 |
| 2003/0020231 A1 | * | 1/2003 | Williams | B65H 7/10 271/227 |

(Continued)

FOREIGN PATENT DOCUMENTS

| | | |
|---|---|---|
| JP | 2012-144348 | 8/2012 |
| JP | 2013-220932 | 10/2013 |
| JP | 5595366 | 8/2014 |

*Primary Examiner* — David H Banh
(74) *Attorney, Agent, or Firm* — Staas & Halsey

(57) ABSTRACT

A scanner apparatus includes a document feeding path in which a reading device configured to read an image from a document is provided, a first registration roller configured to feed the document along the document feeding path, and located at an upstream side of the reading device based on a feeding direction of the document, a second registration roller aligned with the first registration roller in a width direction of the document, and located spaced apart from the first registration roller in the width direction, a registration motor configured to drive the first registration roller, and a main motor configured to drive the second registration roller.

20 Claims, 12 Drawing Sheets

(56) References Cited

U.S. PATENT DOCUMENTS

| | | | | |
|---|---|---|---|---|
| 2005/0263958 A1* | 12/2005 | Knierim | ................ | B65H 9/002 |
| | | | | 271/272 |
| 2008/0080024 A1* | 4/2008 | Ishido | ................ | H04N 1/00572 |
| | | | | 358/498 |
| 2009/0322016 A1* | 12/2009 | Herrmann | ................ | B65H 9/12 |
| | | | | 271/226 |
| 2011/0091236 A1* | 4/2011 | Oi | ................ | G03G 15/1675 |
| | | | | 399/90 |
| 2011/0122466 A1* | 5/2011 | Tanimura | ........... | H04N 1/00846 |
| | | | | 358/518 |
| 2015/0076763 A1* | 3/2015 | Katsura | ................ | B65H 7/02 |
| | | | | 271/227 |

\* cited by examiner

SCANNER APPARATUS, IMAGE FORMING APPARATUS EMPLOYING THE SAME, AND SKEW CORRECTION METHOD

CROSS-REFERENCE TO RELATED APPLICATIONS

This application claims the priority benefit of Korean Patent Application No. 10-2016-0001609, filed on Jan. 6, 2016, in the Korean Intellectual Property Office, the disclosure of which is incorporated herein in its entirety by reference.

BACKGROUND

1. Field

The disclosure relates to a scanner apparatus for reading an image from a document, an image forming apparatus employing the scanner apparatus, and a skew correction method.

2. Description of the Related Art

A scanner apparatus is an apparatus configured to irradiate light onto a document and receive the light reflected from the document to read an image recorded on the document. The document loaded on a document feed tray is fed along a document feeding path by a plurality of document feeding rollers. A reading device is located in the document feeding path to read the image from the document. After the image is read, the document is discharged to a document output tray. A contact type image sensor (CIS) or a charge coupled device (CCD) may be employed as the reading device.

When the document is fed along the document feeding path while being tilted with respect to a feeding direction, the read image may be tilted and a document jam may occur. Feeding of the document while the document is tilted with respect to the feeding direction is referred to as a skew. In order to correct a skew, a method of temporarily stopping a registration roller and then rotating the registration roller again is used. In this case, after a front end of the document contacts the registration roller, the document partially bends and the front end of the document is aligned to the registration roller, thereby correcting the skew. Then, when the registration roller is rotated again, the document having the corrected skew is fed again.

As operation of the scanner apparatus is accelerated, noise generated by an impact between the stopped registration roller and the front end of the document while correcting the skew, and switching noise and high frequency noise generated while controlling driving power of a motor transmitted to the registration roller may increase. Also, when the speed of feeding in a document is high, it is difficult to correct a skew of documents having various thicknesses.

SUMMARY

Provided are a scanner apparatus capable of stably correcting a skew, an image forming apparatus employing the scanner apparatus, and a skew correction method.

Additional aspects and/or advantages will be set forth in part in the description which follows and, in part, will be apparent from the description, or may be learned by practice of the disclosed embodiments.

According to an aspect of an embodiment, a scanner apparatus may include: a document feeding path in which a reading device configured to read an image from a document is provided, a first registration roller configured to feed the document along the document feeding path, and located at an upstream side of the reading device based on a feeding direction of the document, a second registration roller aligned with the first registration roller in a width direction of the document, and located spaced apart from the first registration roller in the width direction, a registration motor configured to drive the first registration roller, and a main motor configured to drive the second registration roller.

End portions of the first and second registration rollers, which are adjacent to each other, may be connected to each other through a bearing.

The scanner apparatus may further include a bearing holder fixed to one of the end portions of the first and second registration rollers and by which the bearing is supported, wherein the other end portion of the first and second registration rollers may be supported by the bearing.

The scanner apparatus may further include first and second supports respectively supporting end portions of the first and second registration rollers, which are adjacent to each other.

The scanner apparatus may further include a document feeding roller configured to feed the document along the document feeding path, wherein the main motor may be configured to drive the document feeding roller.

The scanner apparatus may further include: a registration sensor detecting the document, the registration sensor including a first registration sensor at a downstream side of the first registration roller and a second registration sensor at a downstream side of the second registration roller, and a controller configured to detect a front end skew amount of the document from a detection time deviation of a front end of the document by the first and second registration sensors.

The controller may be further configured to drive the main motor and the registration motor at a constant speed such that a rotation linear speed of the first and second registration rollers is equal to a process speed, and change a speed of the registration motor such that the front end skew amount is corrected, after the front end of the document is detected by the first and second registration sensors.

The controller may be further configured to drive the registration motor at a reference speed such that the rotation linear speed of the first registration roller is equal to the process speed, after the front end skew amount of the document is corrected.

The controller may be further configured to detect a rear end skew amount of the document from a detection time deviation of a rear end of the document by the first and second registration sensors, calculate a new reference speed based on the rear end skew amount, and drive the registration motor based on the new reference speed.

The main motor may include a brushless direct current (BLDC) motor.

The registration motor may be any one of a stepping motor, a direct current (DC) motor, and an inner-rotor type BLDC motor.

According to an aspect of another embodiment, an image forming apparatus may include the scanner apparatus described above, and a printer configured to form an image on a recording medium.

According to an aspect of another embodiment, a skew correction method may include: rotating, at a process speed, a first registration roller located at an upstream side of a reading device based on a feeding direction of document, by using a registration motor, rotating, at the process speed, a second registration roller aligned with the first registration roller in a width direction of the document and spaced apart from the first registration roller in the width direction, by using a main motor, calculating a front end skew amount from a detection time deviation of a front end of the document by first and second registration sensors disposed at a downstream side of the first and second registration roller, respectively and spaced apart from each other in the width direction, and correcting the front end skew amount by changing a speed of the registration motor.

The skew correction method may further include, after the correcting of the front end skew amount, driving the registration motor at a reference speed such that the first registration roller is rotated at the process speed.

The skew correction method may further include: calculating a rear end skew amount from a detection time deviation of a rear end of the document by the first and second registration sensors, calculating a new reference speed for correcting the rear end skew amount, and driving the registration motor at the new reference speed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
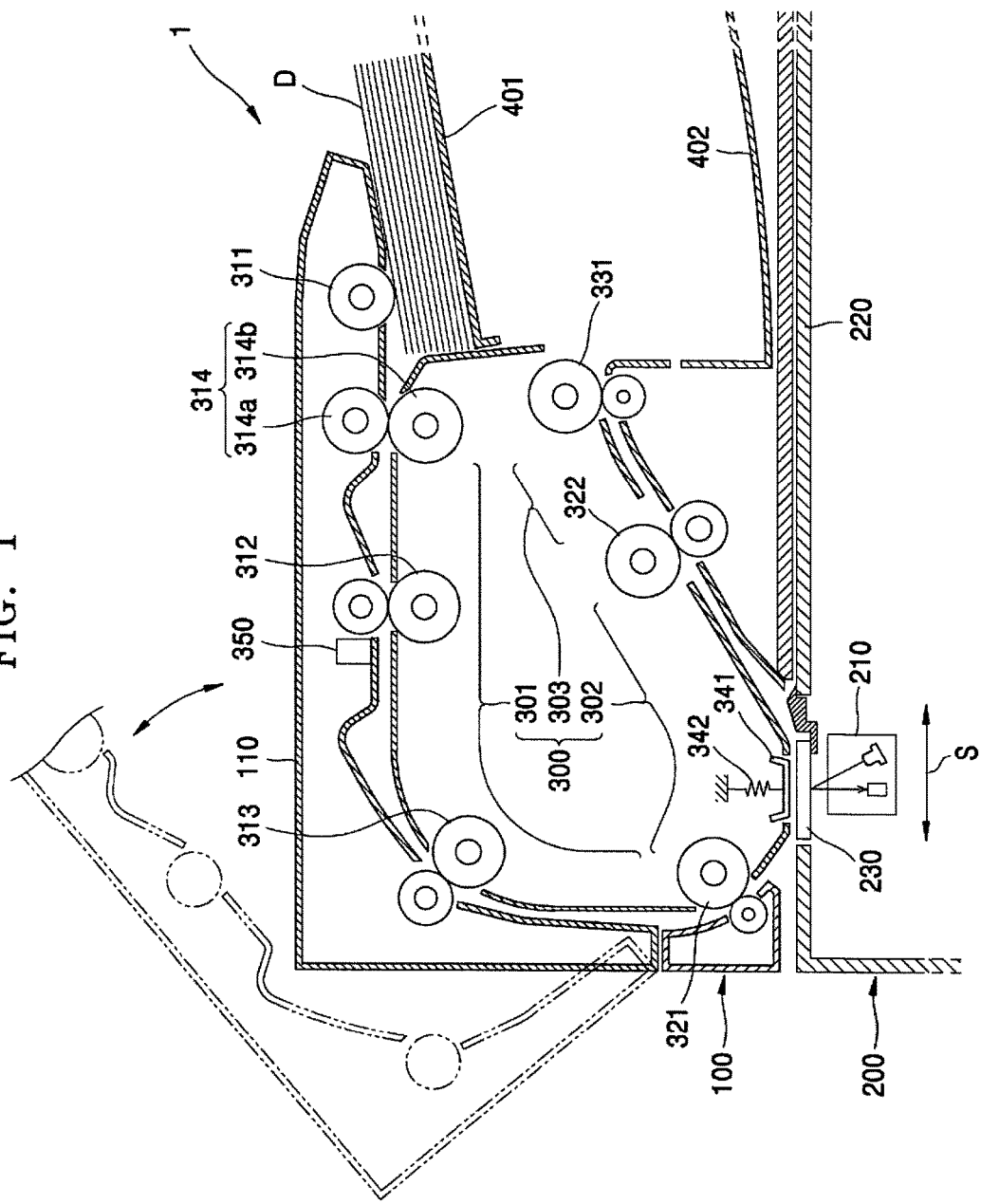
FIG. 1 is a cross-sectional view of a scanner apparatus according to an embodiment.

Reference will now be made in detail to embodiments, examples of which are illustrated in the accompanying drawings, wherein like reference numerals refer to like elements throughout and sizes and thickness of components may be exaggerated for clarity. In this regard, the embodiments may have different forms and should not be construed as being limited to the descriptions set forth herein. Accordingly, the embodiments are merely described below, by referring to the figures, to explain aspects.

Figure 2:
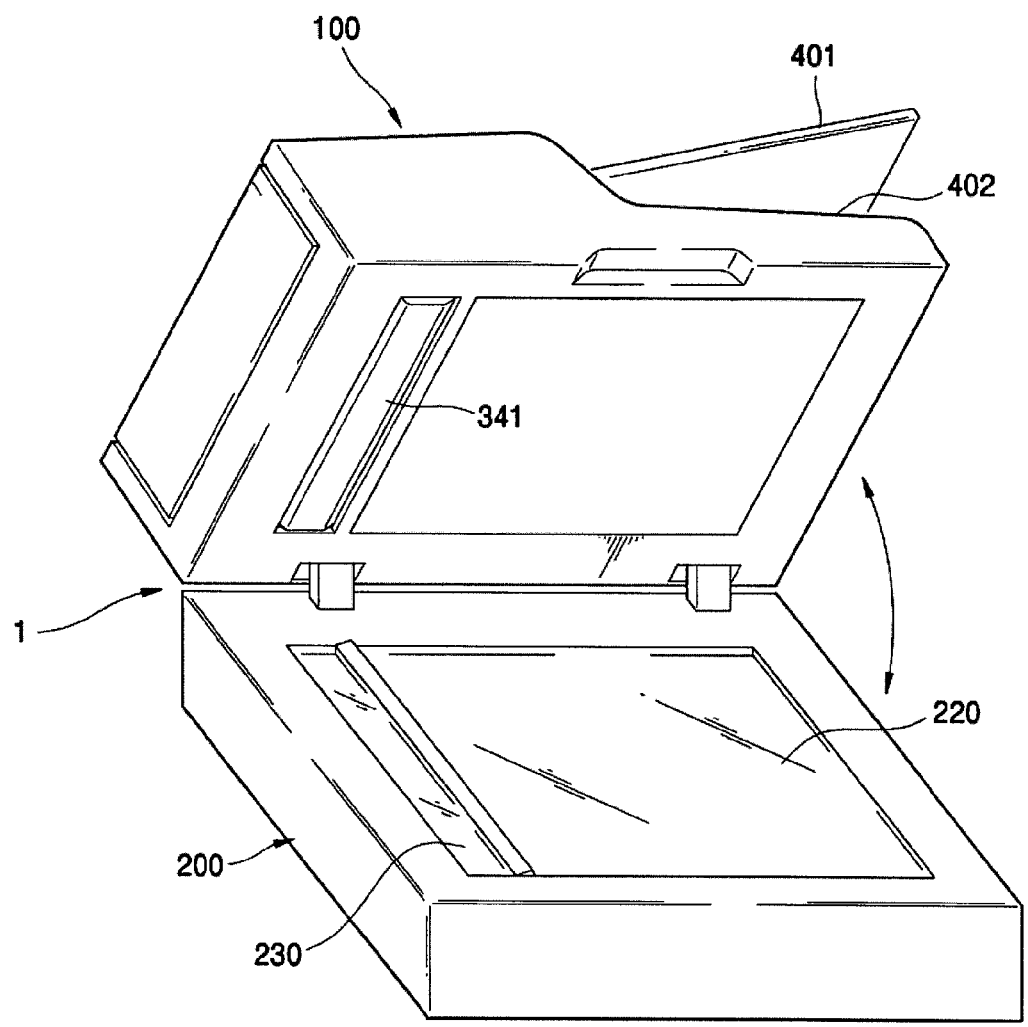
FIG. 2 is a perspective view of the scanner apparatus of FIG. 1, in which a document feeder is opened, according to an embodiment.

FIG. 1 is a cross-sectional view of a scanner apparatus 1 according to an embodiment, and FIG. 2 is a perspective view of the scanner apparatus 1 of FIG. 1, in which a document feeder 100 is opened, according to an embodiment.

Referring to FIGS. 1 and 2, the scanner apparatus 1 may include the document feeder 100 and a reader 200.

The reader 200 may include a reading device 210 for reading an image from a document D. The reading device 210 reads an image of the document D by irradiating light onto the document D and receiving light reflected from the document D. The reading device 210 may be, for example, a contact type image sensor (CIS) or a charge coupled device (CCD).

The scanner apparatus 1 may use a flatbed method in which the document D is at a fixed location and an image is read while the reading device 210, such as a CIS or a CCD, is moved, a document feed method in which the reading device 210 is at a fixed location and the document D is moved, or a combined method thereof. The scanner apparatus 1 according to the current embodiment uses the combined method of the flatbed method and the document feed method.

The reader 200 may include platen glass 220 on which the document D is placed so as to read the image from the document in the flatbed method. Also, the reader 200 may include a reading window 230 for reading the image from the document D in the document feed method. The reading window 230 may be, for example, transparent. According to an embodiment, a top surface of the reading window 230 may be at the same height as a top surface of the platen glass 220.

When the document feed method is used, the reading device 210 is placed below the reading window 230. When the flatbed method is used, the reading device 210 may be moved in a sub-scanning direction S, i.e., a length direction of the document D, below the platen glass 220, via a moving unit (not shown). Also, when the flatbed method is used, the platen glass 220 may be exposed externally so as to place the document D on the platen glass 220. Accordingly, as shown in FIG. 2, the document feeder 100 may be pivotable with respect to the reader 200. The document feeder 100 may move to a first location covering the reader 200 or to a second location opened with respect to the reader 200. The platen glass 220 is exposed when the document feeder 100 is at the second location.

The document feeder 100 moves the document D such that the reading device 210 reads the image recorded on the document D, and discharges the document D that has been read. Accordingly, the document feeder 100 has a document feeding path 300, and the reading device 210 reads the image from the document D fed along the document feeding path 300. The document feeding path 300 may include, for example, a supply path 301, a reading path 302, and a discharge path 303. The reading device 210 is provided in the reading path 302, and the image recorded on the document D is read by the reading device 210 while the document D passes the reading path 302. The supply path 301 is a path for supplying the document D to the reading path 302, and the document D loaded on a supply tray 401 is supplied to the reading path 302 through the supply path 301. The discharge path 303 is a path for discharging the document D that passed the reading path 302. Accordingly, the document D loaded on the supply tray 401 is moved along the supply path 301, the reading path 302, and the discharge path 303, and is discharged to a discharge tray 402.

A plurality of document feeding rollers for feeding the document D is provided in the document feeding path 300. For example, a pickup roller 311 for picking up the document D loaded on the supply tray 401 and feeding rollers 312 and 313 for feeding the picked up document D may be provided in the supply path 301. The feeding rollers 312 and 313 are rotated by receiving driving power from a motor (not shown). A driven roller may contact each of the feeding rollers 312 and 313 to be rotated with the feeding rollers 312 and 313. The document D is fed by being engaged between the feeding rollers 312 and 313, and the driven rollers contacting and rotating with the feeding rollers 312 and 313. As will be described later, in order to prevent a document jam, the driven rollers may be spaced apart from the feeding rollers 312 and 313 or pressure applied between the feeding rollers 312 and 313, and the driven rollers may be released when the supply path 301 is opened.

An automatic document feeder (ADF) 314 that separates the picked up document D from other documents may be provided between the pickup roller 311 and the feeding roller 312. The ADF 314 may include, for example, first and second ADF rollers 314a and 314b, which are engaged with each other and rotated in opposite directions. The first ADF roller 314a is connected to a motor to be rotated in a document feeding direction for feeding in the document D along the supply path 301, and the second ADF roller 314b is connected to the motor to be rotated in an opposite direction of the document feeding direction. Although not illustrated, a unidirectional clutch is provided between the second ADF roller 314 and the motor. The unidirectional clutch provides reverse rotary power to the second ADF roller 314b. When two or more documents are fed in between the first and second ADF rollers 314a and 314b, only one document D may be separated by using a difference of frictional force and supplied to the feeding roller 312. For example, when a plurality the documents are fed in between the first and second ADF rollers 314a and 314b, a frictional force between the document D and the other documents is smaller than a frictional force between the first ADF roller 314a and the document D and a frictional force between the second ADF roller 314b and the document D. Accordingly, the document D contacting the first ADF roller 314a and another document below the document D slide away from each other, and only the document D contacting the first ADF roller 314a is separated and fed to the feeding roller 312. A structure of the ADF 314 is not limited to that shown in FIG. 1, and may be any one of various well-known structures.

Feeding rollers 321 and 322 that feed the document D may be provided in the reading path 302. For example, the feeding rollers 321 and 322 that feed the document D may be provided respectively on two sides of the reading device 210. The feeding rollers 321 and 322 are rotated by receiving driving power from a motor (not shown). A driven roller may contact each of the feeding rollers 321 and 322 to be rotated with the feeding rollers 321 and 322. The document D is fed by being engaged between the feeding rollers 321 and 322, and the driven rollers contacting and rotating with the feeding rollers 321 and 322.

A reading guide member 341 facing the reading device 210 may be provided in the reading path 302. The reading guide member 341 is pressurized to the reading window 230 by its own weight or by an elastic member 342, and the document D is fed in between the reading window 230 and the reading guide member 341. Although not illustrated, a reading roller that is elastically pressurized to the reading window 230 and rotated, and feeds the document D supplied between the reading window 230 and the reading roller may be employed instead of the reading guide member 341.

A discharge roller 331 that discharges the document D that has been read is provided in the discharge path 303. The discharge roller 331 is rotated by receiving driving power from a motor (not shown). A driven roller contacts the discharge roller 331 to be rotated with the discharge roller 331. The document D is fed by being engaged between the discharge roller 331 and the driven roller rotating by contacting the discharge roller 331.

In order to prevent a document jam, the scanner apparatus 1 according to the current embodiment may include a cover 110 that opens or closes a part of the document feeding path 300. For example, the cover 110 may be in a closed location (shown with a solid line in FIG. 1) forming the supply path 301, and an opened location (shown with an alternating long and two short dashes line in FIG. 1) opening the supply path 301. When the cover 110 is in the opened location, the supply path 301 may be partially or entirely opened. The cover 110 may open the supply path 301 by being pivoted as shown with the alternating long and two short dashes line in FIG. 1. Here, the first ADF roller 314a and the driven rollers contacting the feeding rollers 312 and 313 may move together with the cover 110 and be separated from the second ADF roller 314b and the feeding rollers 312 and 313. Accordingly, the document D in the supply path 301 may be easily removed.

The scanner apparatus 1 may include a registration roller for correcting a skew of the document D. The registration roller is located at an upstream side of the reading device 210 based on a document feeding direction L of FIG. 3. The registration roller may be located at a downstream side of the ADF 314. For example, one of the feeding rollers 312 and 313 may be the registration roller. Hereinafter, the feeding roller 312 is referred to as the registration roller 312, and an example of a structure for correcting a skew will be described.

Figure 3:
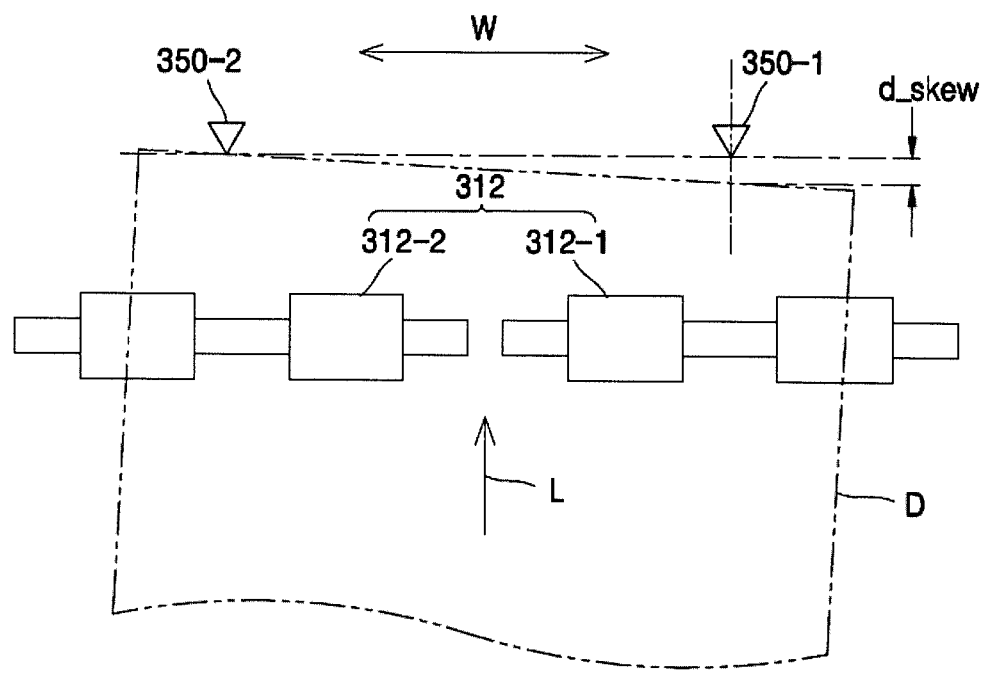
FIG. 3 is a plan view of a registration roller according to an embodiment.

FIG. 3 is a plan view of the registration roller 312 according to an embodiment. Referring to FIG. 3, the registration roller 312 may include a first registration roller 312-1 and a second registration roller 312-2. The first and second registration rollers 312-1 and 312-2 are provided in a width direction W of the document D, and may be individually rotated. Although not illustrated, a driven roller engaged with the first and second registration rollers 312-1 and 312-2 may be integrated, or may be in two separated forms to respectively correspond to the first and second registration rollers 312-1 and 312-2.

Figure 4A:
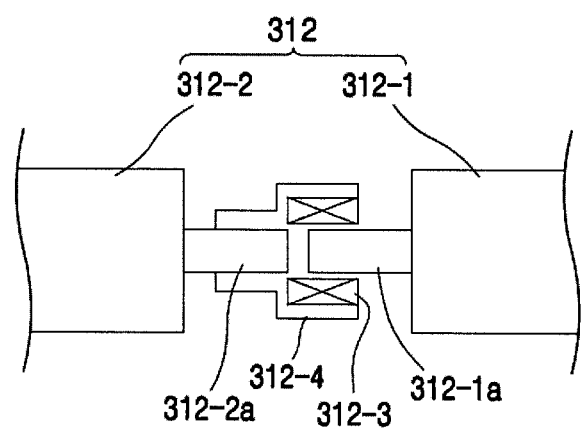
FIG. 4A is a plan view of a registration roller according to another embodiment.

FIG. 4A is a plan view of the registration roller 312 according to another embodiment. Referring to FIG. 4A, the registration roller 312 may include the first registration roller 312-1 and the second registration roller 312-2. The first and second registration rollers 312-1 and 312-2 are provided in the width direction W of the document D, and may be individually rotated. End portions 312-1a and 312-2a of the first and second rollers 312-1 and 312-2, which are adjacent to each other, are connected to each other through a bearing 312-3. For example, a bearing holder 312-4 is fixed to the end portion 312-2a of the second registration roller 312-2. The bearing 312-3 is supported by the bearing holder 312-4. For example, when a ball bearing including an inner race and an outer race, or a needle bearing is employed as the bearing 312-3, the bearing holder 312-4 may support the outer race of the bearing 312-3, and the end portion 312-1a of the first registration roller 312-1 may be inserted into the inner race of the bearing 312-3. As another example, when an oil impregnated sintered bearing is employed as the bearing 312-3, the bearing holder 312-4 may support an outer diameter portion of the bearing 312-3 and the end portion 312-1a of the first registration roller 312-1 may be inserted into an inner diameter portion of the bearing 312-3.

Although not illustrated, the bearing holder 312-4 may be fixed to the end portion 312-1a of the first registration roller 312-1, and the end portion 312-2a of the second registration roller 312-2 may be supported by the bearing 312-3.

Figure 4B:
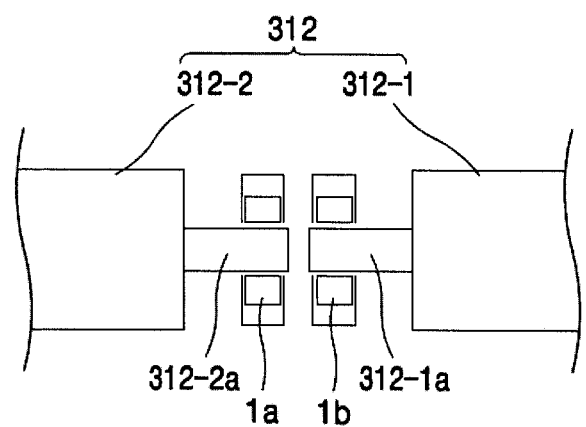
FIG. 4B is a plan view of a registration roller according to another embodiment.

FIG. 4B is a plan view of the registration roller 312 according to another embodiment. Referring to FIG. 4B, the end portions 312-1a and 312-2a of the first and second registration rollers 312-1 and 312-2, which are adjacent to each other, may be respectively rotatably supported by first and second supports 1a and 1b provided in the scanner apparatus 1.

Although not illustrated, driven rollers engaging with the first and second registration rollers 312-1 and 312-2 may be integrated, or may be in two separated forms to respectively correspond to the first and second registration rollers 312-1 and 312-2.

Referring back to FIGS. 1 and 3, a registration sensor 350 detecting the document D is provided at a downstream side of the registration roller 312 based on the document feeding direction L. The registration sensor 350 may include first and second registration sensors 350-1 and 350-2. The first and second registration sensors 350-1 and 350-2 are aligned in the width direction W of the document D and are spaced apart from each other in the width direction W. The first and second registration sensors 350-1 and 350-2 are respectively located at the downstream side of the first and second registration rollers 312-1 and 312-2. A photo-sensor (photo-interruptor) or a micro-switch may be employed as each of the first and second registration sensors 350-1 and 350-2.

Although not illustrated, the scanner apparatus 1 may further include a sensor for detecting the document D in addition to the registration sensor 350. The scanner apparatus 1 may include, for example, a sensor for detecting existence of the document D in the supply tray 401, a sensor for detecting a length of the document D, a sensor, provided in the reading path 302, for detecting the document D to determine a reading start time and a reading completion time by the reading device 210, and a sensor, provided in the discharge path 303, for detecting whether the document D has been discharged.

A skew amount of the document D may be detected by using the first and second registration sensors 350-1 and 350-2. For example, as shown in FIG. 3, when the document becomes skewed, a left front end of the document D is first detected by the second registration sensor 350-2, and then a right front end of the document D is detected by the first registration sensor 350-1. Accordingly, a detection time deviation ΔT of the document D by the first and second registration sensors 350-1 and 350-2 is proportional to a skew amount d_skew of the document D. The skew amount d_skew is obtained by multiplying the detection time deviation ΔT by a document feeding speed of the registration roller 312.

Figure 5:
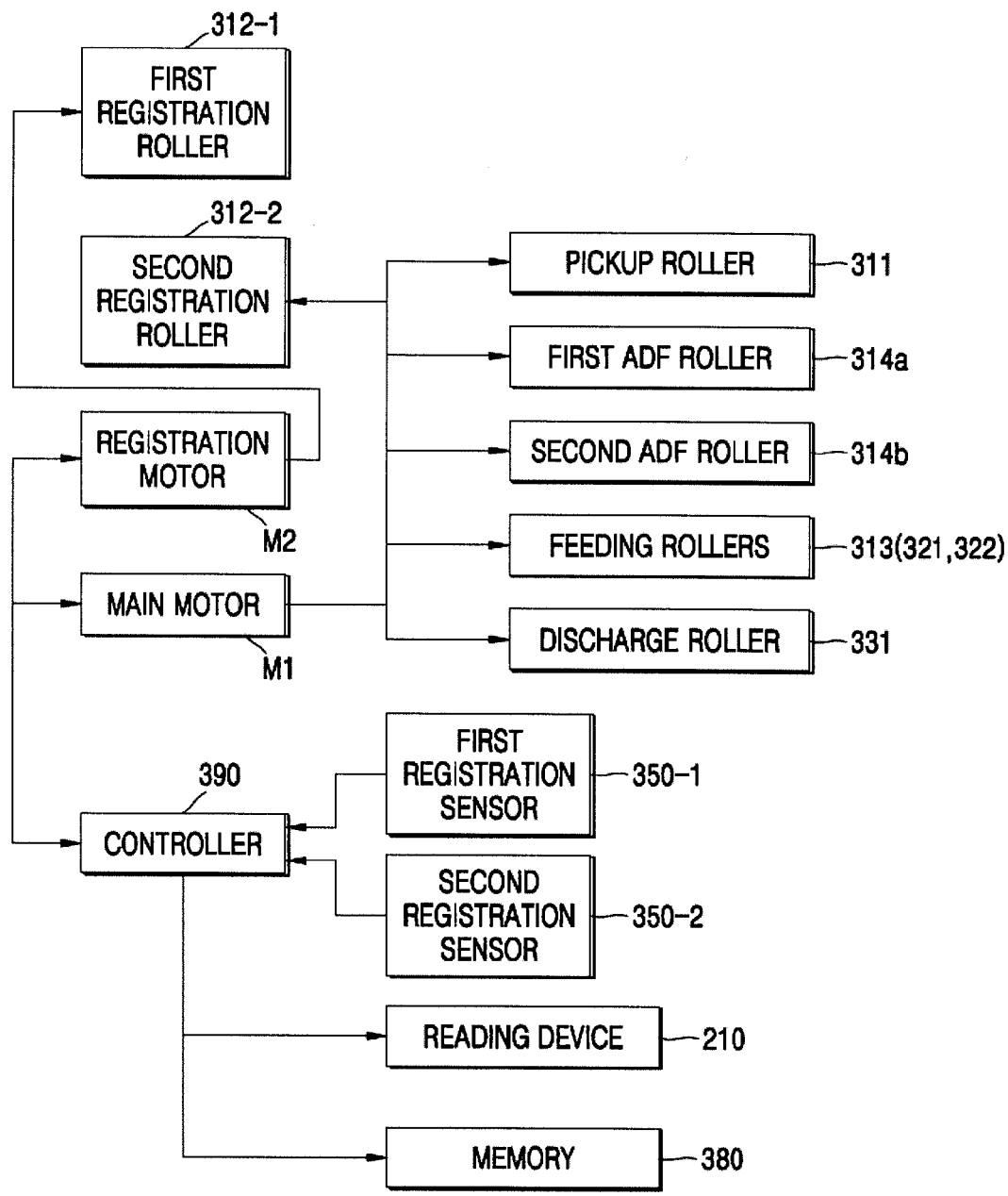
FIG. 5 is a block diagram of a scanner apparatus according to an embodiment.

FIG. 5 is a block diagram of the scanner apparatus 1 according to an embodiment. Referring to FIG. 5, the scanner apparatus 1 may include a main motor M1 and a registration motor M2. The registration motor M2 drives the first registration roller 312-1. The second registration roller 312-2 is driven by the main motor M1. According to such a structure, the first and second registration rollers 312-1 and 312-2 may be individually driven. The main motor M1 may drive rollers other than the first registration roller 312-1. The main motor M1, the registration motor M2, and the rollers may be connected via a power connection element, such as a gear, a belt, or the like. A brushless direct current (BLDC) motor having sufficient driving efficiency may be employed as the main motor M1. Motors capable of changing a speed, such as a stepping motor, a DC motor, and an inner-rotor type BLDC motor may be employed as the registration motor M2.

According to one or more embodiments described above, the first and second registration rollers 312-1 and 312-2 may be independently rotated. Accordingly, the first and second registration rollers 312-1 and 312-2 may be rotated at different rotating speeds for a certain period of time to correct a skew of the document D. For example, when the document D is tilted right, the registration motor M2 may be driven such that the first registration roller 312-1 is rotated faster than the second registration roller 312-2 for a certain period of time. On the other hand, when the document D is tilted left, the registration motor M2 may be driven such that the first registration roller 312-1 is rotated slower than the second registration roller 312-2 for a certain period of time.

Figure 6:
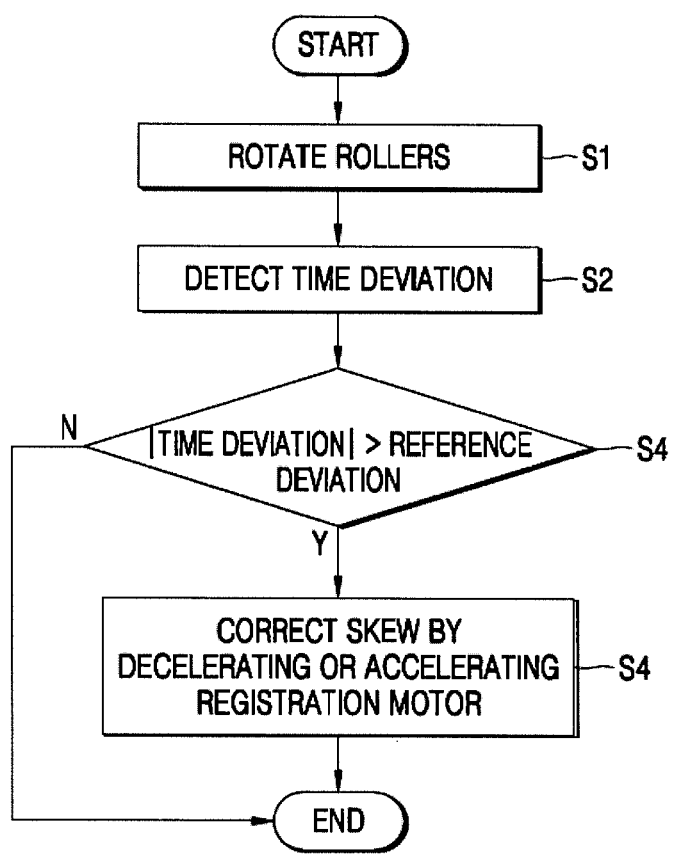
FIG. 6 is a flowchart of a skew correction method with respect to a front end of document, according to an embodiment.

FIG. 6 is a flowchart of a skew correction method with respect to a front end of the document D, according to an embodiment. An embodiment of the skew correction method of the front end of the document D will be described with reference to FIG. 6. According to an embodiment, the main motor M1 is a BLDC motor and the second registration motor M2 is a stepping motor.

When a scan operation starts, a controller 390 drives the main motor M1 and the registration motor M2 such that rollers are rotated in the same linear speed (process speed), in operation S1. Here, a rotating speed of the registration motor M2 is referred to as a reference speed.

The document D from among documents loaded on the supply tray 401 is picked up by the pickup roller 311. Only one document D is conveyed towards the registration roller 312 by the ADF 314. The registration roller 312 feeds in the document D along the supply path 301.

The first and second registration sensors 350-1 and 350-2 detect the front end of the document D that has passed through the registration roller 312, and transmit detection signals to the controller 390. The controller 390 calculates a time deviation ΔT_sensor from the detection signals of the first and second registration sensors 350-1 and 350-2, in operation S2. The time deviation ΔT_sensor is a difference (T_sensor1−T_sensor2) between a time T_sensor2 when the second registration sensor 350-2 detected the front end of the document D and a time T_sensor1 when the first registration sensor 350-1 detected the front end of the document D.

The controller 390 compares an absolute value of the time deviation ΔT_sensor with a reference deviation, in operation S3. The reference deviation is determined in consideration of an allowable skew amount. The reference deviation may be pre-stored in a memory 380.

When the absolute value of the time deviation ΔT_sensor is smaller than the reference deviation, the skew correction process is ended. The controller 390 maintains the reference speed without changing the driving speed of the registration motor M2. The document D is fed in the process speed along the supply path 301, the reading path 302, and the discharge path 303 by the feeding roller 313, the feeding roller 321, the reading device 210, and the feeding roller 322, and the discharge roller 331. The controller 390 controls the reading device 210 to read image information from the document D. The document D that has been read is discharged to the discharge tray 402.

When the absolute value of the time deviation ΔT_sensor is higher than the reference deviation, a skew correction process is performed. The skew correction process may be performed by changing a speed of the registration motor M2, in operation S4.

Figure 7:
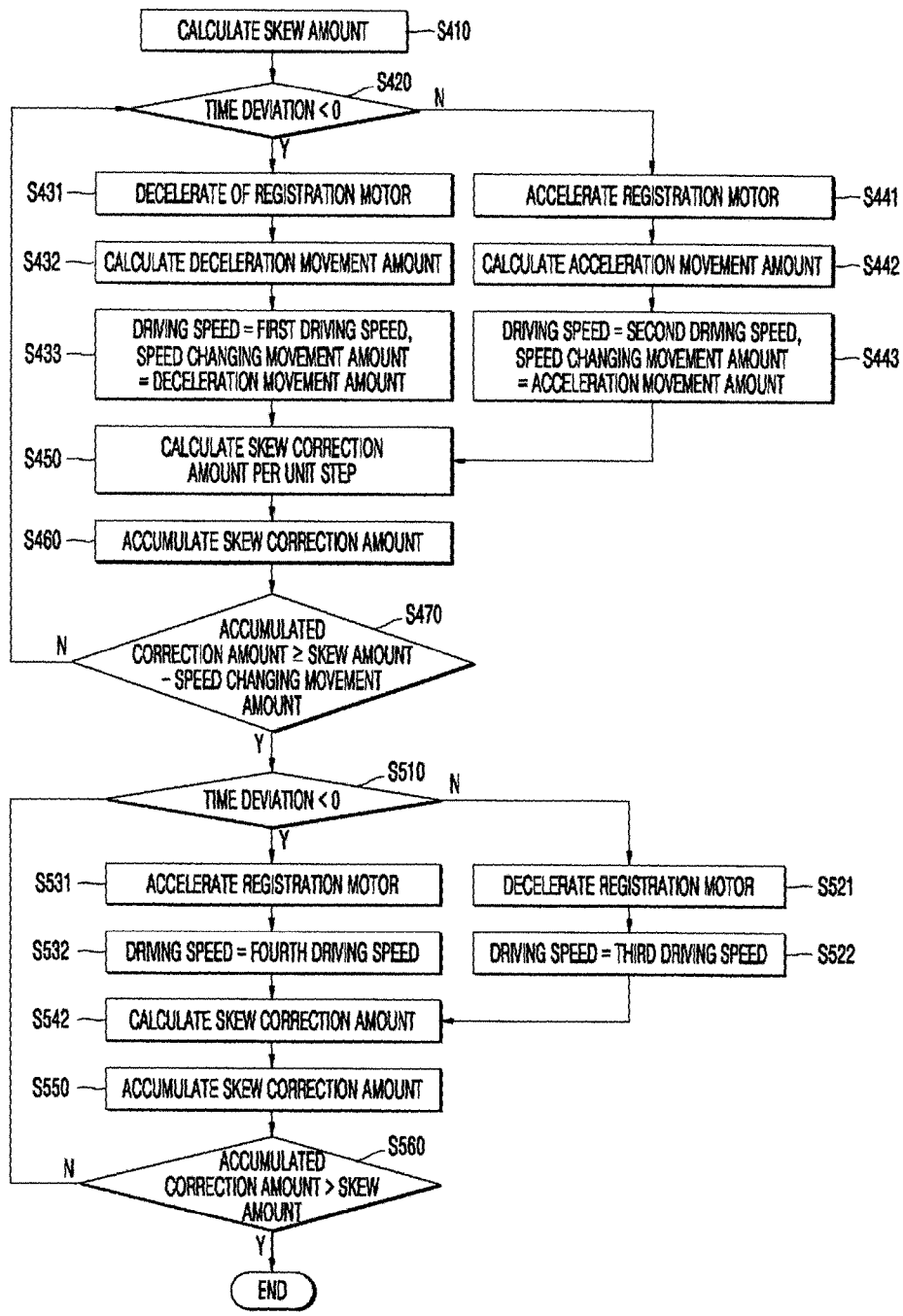
FIG. 7 is a flowchart of correcting of a skew of FIG. 6, according to an embodiment.

FIG. 7 is a flowchart of the correcting of the skew in operation S4 of FIG. 6, according to an embodiment. Referring to FIG. 7, the controller 390 calculates the skew amount d_skew in operation S410. When V_p denotes a process speed, d_skew=V_p×ΔT_sensor.

The controller 390 determines a sign of the time deviation ΔT_sensor, in operation S420. When it is determined that the time deviation ΔT_sensor is a positive, the document D is tilted right in FIG. 3, and when it is determined that the time deviation ΔT_sensor is a negative, the document D is tilted left in FIG. 3.

When the time deviation ΔT_sensor is negative, the controller 390 decelerates the registration motor M2, in operation S431. When the driving speed of the registration motor M2 reaches a first driving speed V_r1, a deceleration movement amount that is a movement amount of the document D during the deceleration is calculated. The deceleration movement amount may be calculated from, for example, a rotation amount of the registration motor M2, a power connection ratio between the registration motor M2 and the first registration roller 312-1, and a diameter of the first registration roller 312-1. The deceleration movement amount may be stored in the memory 380. Since the main motor M1 is not decelerated or accelerated, the linear speed of the second registration roller 312-2 maintains the process speed.

When the time deviation ΔT_sensor is positive, the controller 390 accelerates the registration motor M2, in operation S441. When the driving speed of the registration motor M2 reaches a second driving speed V_r2, an acceleration movement amount that is a movement amount of the document D during the acceleration is calculated. The acceleration movement amount may be calculated from, for example, the rotation amount of the registration motor M2, the power connection ratio between the registration motor M2 and the first registration roller 312-1, and the diameter of the first registration roller 312-1. The acceleration movement amount may be stored in the memory 380. Since the main motor M1 is not decelerated or accelerated, the linear speed of the second registration roller 312-2 maintains the process speed.

Then, the controller 390 controls the registration motor M2 such that a driving speed V_r is set to the first or second driving speed V_r1 or V_r2, and a speed-changing movement amount is set to the deceleration or acceleration movement amount, in operation S433 or S443, and then calculates a skew correction amount d_step per unit step of the registration motor M2 at the driving speed V_r, in operation S450. When the registration motor M2 is a stepping motor, the driving speed V_r may be represented in pulse per second (pps). The skew correction mount d_step may be represented by the driving speed V_r, the process speed, and a moving distance d_r of the document D by the first registration roller 312-1 per unit step. A moving distance d_r1 may be calculated from a rotation amount of the registration motor M2 per unit step, the power connection ratio of the registration motor M2 and the first registration roller 312-1, and the diameter of the first registration roller 312-1. Here, when N(pps) denotes the driving speed V_r and V_p denotes the process speed, the skew correction amount d_step may be calculated according to Equation 1.

$$d\_step = V\_p/N \cdot d\_r \qquad \text{[Equation 1]}$$

Then, the controller 390 may calculate an accumulated correction amount by accumulating the skew correction amount d_step, in operation S460, and compares the accumulated correction amount and a value obtained by subtracting the speed-changing movement amount from the skew amount d_skew, in operation S470. When the accumulated correction amount is smaller than the value obtained by subtracting the speed-changing movement amount from the skew amount d_skew, operation S420 is performed to repeat above processes. Here, the first or second driving speed V_r1 or V_r2 may be controlled such as not to be lower than a predetermined lowest driving speed or higher than a predetermined highest driving speed. The controller 390 may control the registration motor M2 such that the first or second driving speed V_r1 or V_r2 is maintained when the first or second driving speed V_r1 or V_r2 reaches the lowest driving speed or the highest driving speed.

When it is determined that the accumulated correction amount is equal to or higher than the value obtained by subtracting the speed-changing movement amount from the skew amount d_skew in operation S470, the controller 390 determines whether to accelerate or decelerate the registration motor M2 in operation S510 based on the sign of the time deviation ΔT_sensor.

When the time deviation ΔT_sensor is positive, the controller 390 decelerates the registration motor M2 to a third driving speed V_r3, in operation S521. Then, the driving speed V_r is set to the third driving speed V_r3, in operation S522.

When the time deviation ΔT_sensor is negative, the controller 390 accelerates the registration motor M2 to a fourth driving speed V_r4, in operation S531. Then, the driving speed V_r is set to the fourth driving speed V_r4 in operation S532.

Next, the controller 390 calculates the skew correction amount d_step by using Equation 1 in operation S542, calculates the accumulated correction amount by accumulating the skew correction amount d_step in operation S550, and compares the accumulated correction amount and the skew amount d_skew in operation S560. When the accumulated correction amount is smaller than the skew amount d_skew, operation S510 is performed to repeat above processes. Here, the third or fourth driving speed V_r3 or V_r4 may be controlled such as not to be lower than the lowest driving speed or higher than the highest driving speed. When the accumulated correction amount is not smaller than the skew amount d_skew, a front end skew correction process is ended.

When the front end skew correction process is ended, the controller 390 drives the registration motor M2 at the reference speed. The document D is fed at the process speed along the supply path 301, the reading path 302, and the discharge path 303 by the feeding roller 313, the feeding roller 321, the reading device 210, the feeding roller 322, and the discharge roller 331. The controller 390 reads the image information from the document D by controlling the reading device 210. The document D that has been read is discharged to the discharge tray 402.

Figure 8A:
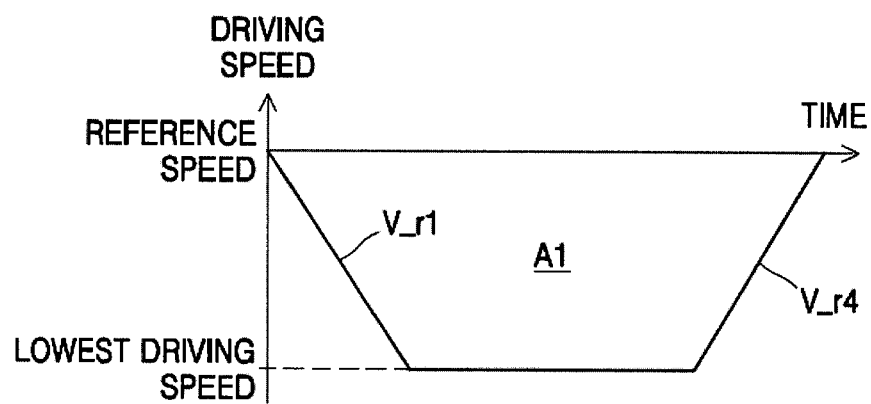
FIGS. 8A and 8B illustrate examples of a driving profile of a registration motor when a time deviation is negative.
Figure 8B:
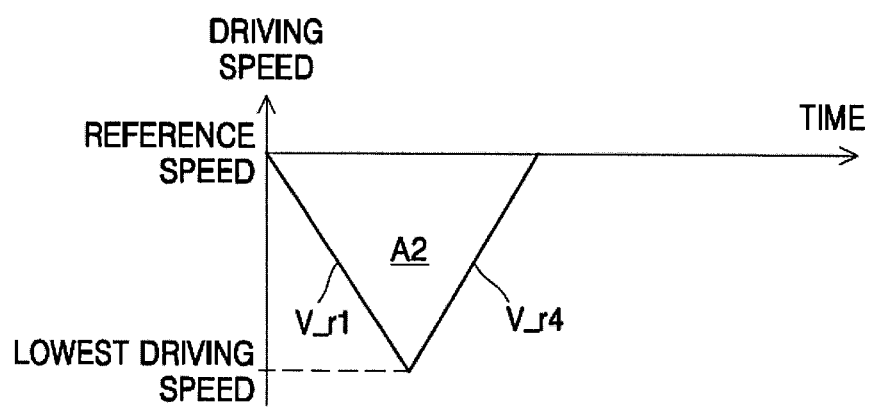

FIGS. 8A and 8B illustrate examples of a driving profile of the registration motor M2 when the time deviation ΔT_sensor is a negative. FIG. 8A illustrates the driving profile obtained when the first driving speed V_r1 reaches the lowest driving speed during an initial deceleration process due to the high skew amount d_skew. Regarding the driving speed of the registration motor M2, when the first driving speed V_r1 reaches the lowest driving speed, the first driving speed V_r1 maintains the lowest driving speed and then is accelerated to the fourth driving speed V_r4 later. FIG. 8B illustrates the driving profile obtained when the first driving speed V_r1 reaches the lowest driving speed but is soon accelerated to the fourth driving speed V_r4 that is larger than the lowest driving speed during the initial deceleration process due to the low skew amount d_skew. Inner areas A1 and A2 of the driving profiles in FIGS. 8A and 8B are accumulated correction amounts corrected by controlling a speed of the registration motor M2.

Figure 8C:
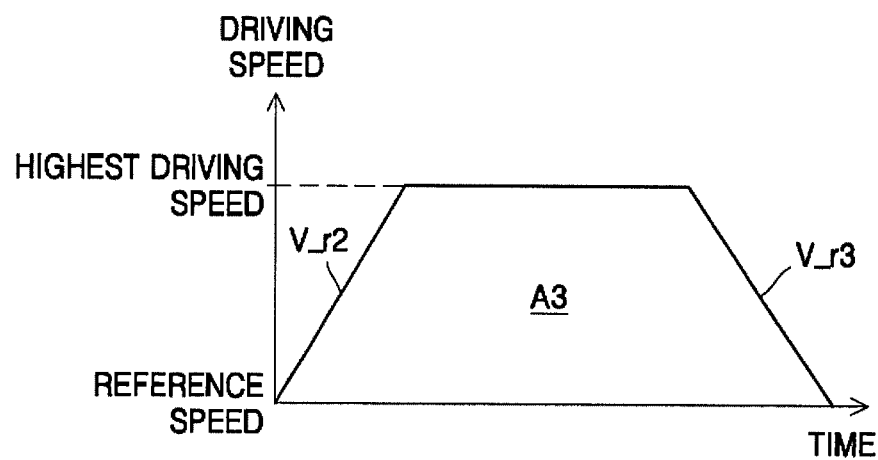
FIGS. 8C and 8D illustrate examples of a driving profile of a registration motor when a time deviation is positive.
Figure 8D:
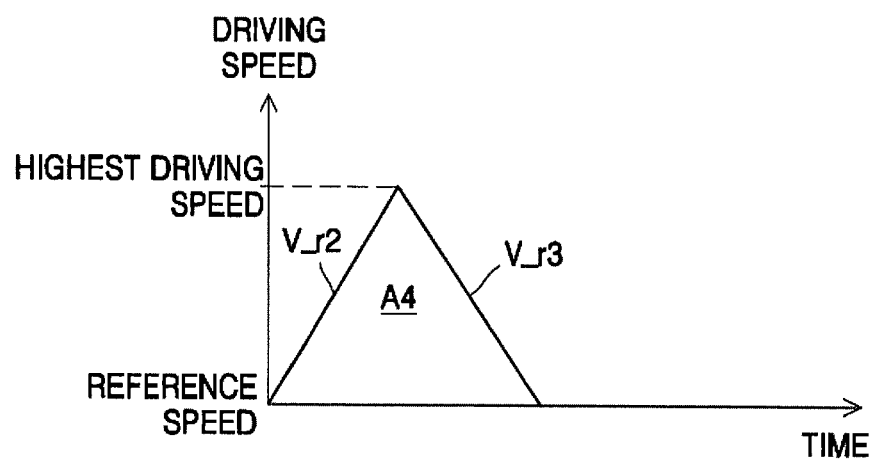

FIGS. 8C and 8D illustrate examples of a driving profile of the registration motor M2 when the time deviation ΔT_sensor is a positive. FIG. 8C illustrates the driving profile obtained when the second driving speed V_r2 reaches the highest driving speed during an initial acceleration process due to the high skew amount d_skew. When driving speed of the registration motor M2 reaches the highest driving speed, the second driving speed V_r2 maintains the highest driving speed and then is decelerated to the third driving speed V_r3 later. FIG. 8D illustrates the driving profile obtained when the second driving speed V_r2 reaches the highest driving speed but is soon accelerated to the third driving speed V_r3 that is smaller than the highest driving speed during the initial acceleration process due to the low skew amount d_skew. Inner areas A3 and A4 of the driving profiles in FIGS. 8C and 8D are accumulated correction amounts corrected by controlling a speed of the registration motor M2.

As described above, according to the scanner apparatus 1 of the current embodiment, when the main motor M1 starts to be driven during the skew correction process of the front end, the main motor M1 does not stop and is continuously driven. Also, the driving speed of the main motor M1 is maintained such that the rollers maintain the process speed. Accordingly, motor startup noise may be reduced, and a BLDC motor having high driving efficiency may be used as the main motor M1.

According to a general skew correction structure, the document D is fed while an integrated registration roller is stopped, and the document D is continuously fed even after the front end of the document contacts the integrated registration roller. For example, when the left front end of the document D contacts the integrated registration roller first, the left front end of the document D is not fed but is elastically bent, and only the right front end of the document D is fed. Accordingly, a skew is corrected and the front end of the document D is aligned to the integrated registration roller. When the integrated registration roller is rotated after a certain period of time, the document D is fed by the integrated registration roller while the skew is being corrected. According to such a general skew correction structure, impact noise may be generated as the document D hits the stopped integrated registration roller. Also, when the integrated registration roller starts to be rotated, the document D that is elastically bent may be unbent, thereby generating noise. Sound of such noise increases when a driving speed of a scanner apparatus increases and when rigidity of the document D is high. Also, when the integrated registration roller is driven by a separate motor, startup noise of the separate motor may be generated, and when driving power of the separate motor transmitted to the integrated registration roller is controlled by a clutch, switching noise of the clutch is generated. Also, the separate motor need to have high power capacity since rapid acceleration or deceleration is performed. In addition, a registration sensor is located at an upstream side of the integrated registration roller in order to determine a point of time when the integrated registration roller starts to be rotated.

According to the current embodiment, the registration roller 312 is divided into the first and second registration rollers 312-1 and 312-2, and a skew is corrected by fixing the rotation speed of the second registration roller 312-2 to the process speed and controlling the rotation speed of the first registration roller 312-1. Accordingly, impact noise generated by the registration roller 312 and the document D is not generated as in the general skew correction structure. Also, since the document D is not bent during the skew correction process, noise is not generated by the document D. In addition, once the registration roller 312 starts to be driven, the registration roller 312 is continuously rotated and is not stopped and then restarted. Accordingly, even when a plurality of documents are sequentially fed, startup noise of the registration motor M2 is generated only once. Accordingly, high frequency noise that is generated in the general skew correction structure is not generated. Also, since a skew is corrected by detecting a skew amount of the document D by using the registration sensor 350 located at the downstream side of the registration roller 312, the skew may be stably corrected regardless of a type of the document D. Since acceleration or deceleration is performed while the registration roller 312 is continuously rotated, the registration motor M2 may have small power capacity compared to the general skew correction structure. The registration motor M2 may be any motor capable of changing a speed, such as a stepping motor, a DC motor, or an inner-rotor type BLDC motor, and thus expenses of parts may be reduced and power consumption may also be reduced.

After a skew of the front end of the document D is corrected, a rear end of the document D may be detected simultaneously by the first and second registration sensors 350-1 and 350-2. However, since the first and second registration rollers 312-1 and 312-2 are respectively driven by the registration motor M2 and the main motor M1, rotation amounts of the first and second registration rollers 312-1 and 312-2 may be different, and thus a rear end skew may be generated in the document D. The difference between the rotation amounts of the first and second registration rollers 312-1 and 312-2 may be reflected to the driving speed of the registration motor m2 so as to control the reference speed of the registration motor M2 when a next document is fed.

The difference between the rotation amounts of the first and second registration rollers 312-1 and 312-2 may be detected by a time deviation ΔT_sensor2 at the rear end of the document D by the first and second registration sensors 350-1 and 350-2.

The controller 390 calculates the time deviation ΔT_sensor2 at the rear end of the document D from detection signals of the first and second registration sensors 350-1 and 350-2. The time deviation ΔT_sensor2 is a difference (T_sensor1−T_sensor2) between a time T_sensor2 when the second registration sensor 350-2 detected the rear end of the document D and a time T_sensor1 when the first registration sensor 350-1 detected the rear end of the document D.

The controller 390 compares an absolute value of the time deviation ΔT_sensor2 with a reference deviation. The reference deviation is determined in consideration of an allowable skew amount. The reference deviation may be pre-stored in the memory 380. The reference deviation may be the same as or different from the reference deviation used while correcting a skew at the front end of the document D.

When the absolute value of the time deviation $\Delta T\_sensor2$ is smaller than the reference deviation, the controller 390 does not change the reference speed of the registration motor M2. When the absolute value of the time deviation $\Delta T\_sensor2$ is larger than the reference deviation, the controller 390 starts processes of changing the reference speed of the registration motor M2.

Figure 9:
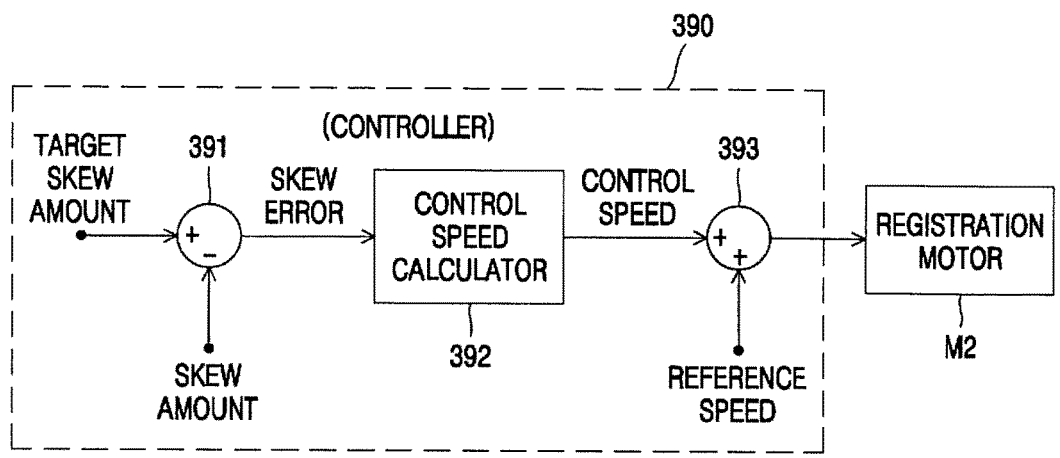
FIG. 9 is a block diagram of a reference speed changing control circuit of a registration motor, according to an embodiment.

FIG. 9 is a block diagram of a reference speed changing control circuit of the registration motor M2, according to an embodiment. The reference speed changing control circuit of FIG. 9 may be realized as a part of the controller 390. Referring to FIG. 9, a target skew amount and a skew amount (rear end skew amount) are input to a subtractor 391. The target skew amount may correspond to the reference deviation described above. A skew amount d_skew2 may be calculated from the time deviation $\Delta T\_sensor2$ of the rear end of the document D by the first and second registration sensors 350-1 and 350-2. For example, when $V\_p$ denotes the process speed, the skew amount d_skew2 may be calculated according to Equation 2.

$$d\_skew2 = V\_p \times \Delta T\_sensor \qquad \text{[Equation 2]}$$

A control speed calculator 392 calculates a changing amount of the reference speed, i.e., a control speed, from the target skew amount and the skew amount. The control speed calculator 392 may be embodied by a proportional controller, a proportional-integral controller, proportional-differential controller, or a combination of at least two thereof.

An adder 393 calculates a new reference speed by adding the reference speed and the control speed. The controller 390 drives the registration motor M2 based on the new reference speed.

Figure 10:
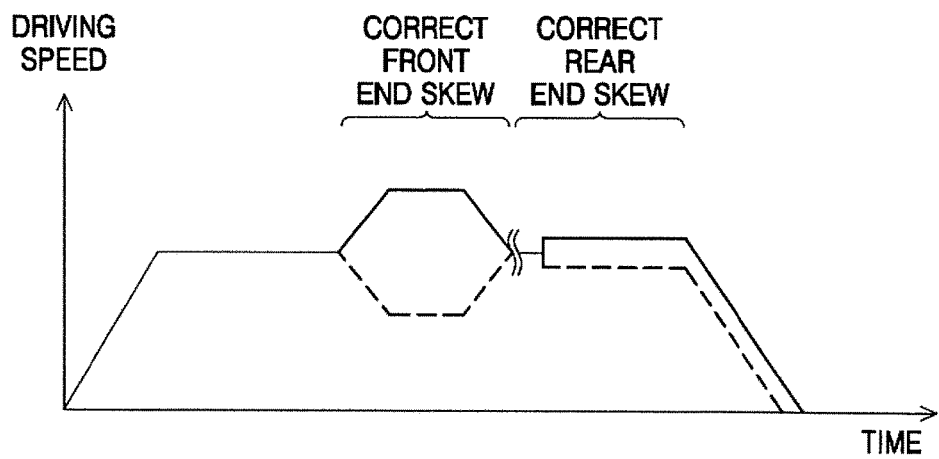
FIG. 10 illustrates an example of a driving profile of a registration motor when one document is fed.

FIG. 10 illustrates an example of a driving profile of the registration motor M2 when one document D is fed. In FIG. 10, a solid line denotes a case when the registration motor M2 is accelerated to correct a skew, and a broken line denote a case when the registration motor M2 is decelerated to correct a skew.

Figure 11:
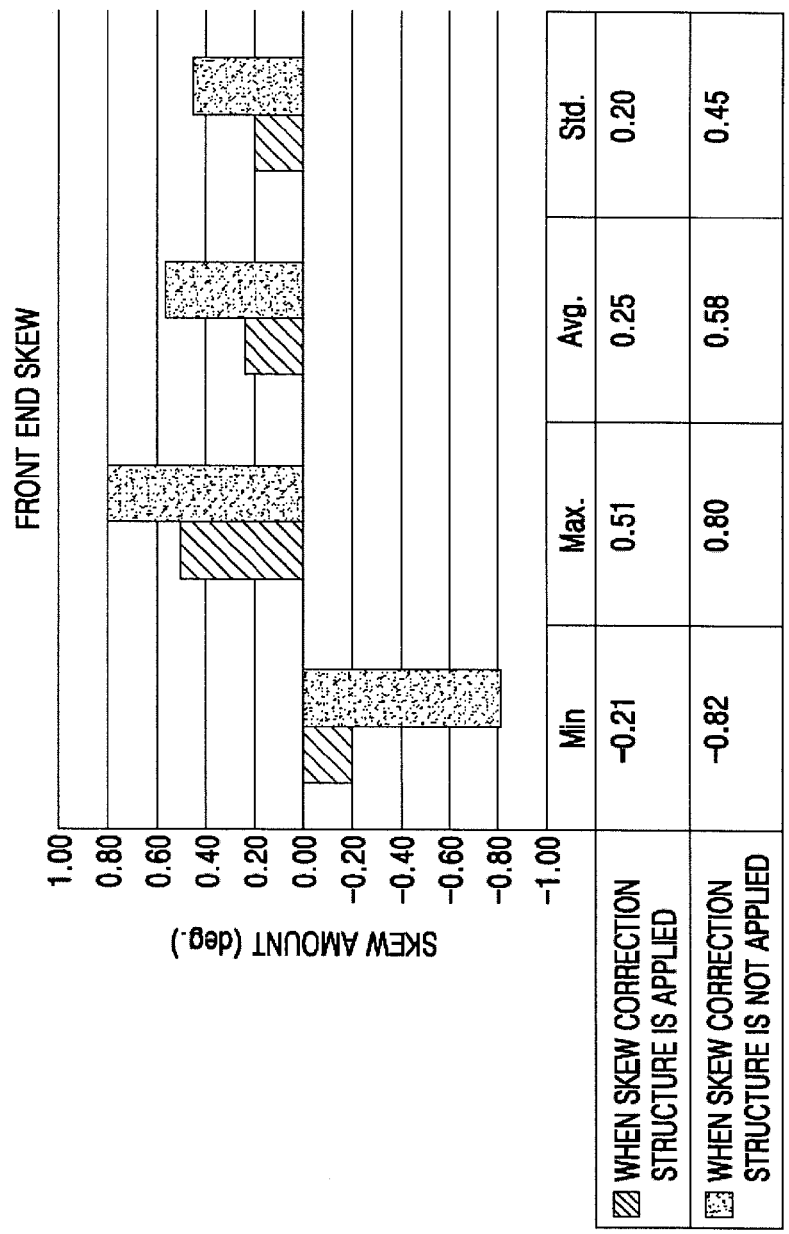
FIG. 11 is a graph showing results of testing a skew amount when a skew correction structure, according to an embodiment, is employed in a scanner apparatus and when not employed.

FIG. 11 is a graph showing results of testing a skew amount when a skew correction structure, according to an embodiment, is employed in a scanner apparatus and when not employed. In FIG. 11, a skew amount is in units of degrees of an angle. Referring to FIG. 11, when the skew correction structure of the current embodiment is employed, an average skew amount is half the amount of when the skew correction structure of the current embodiment is not employed.

Figure 12:
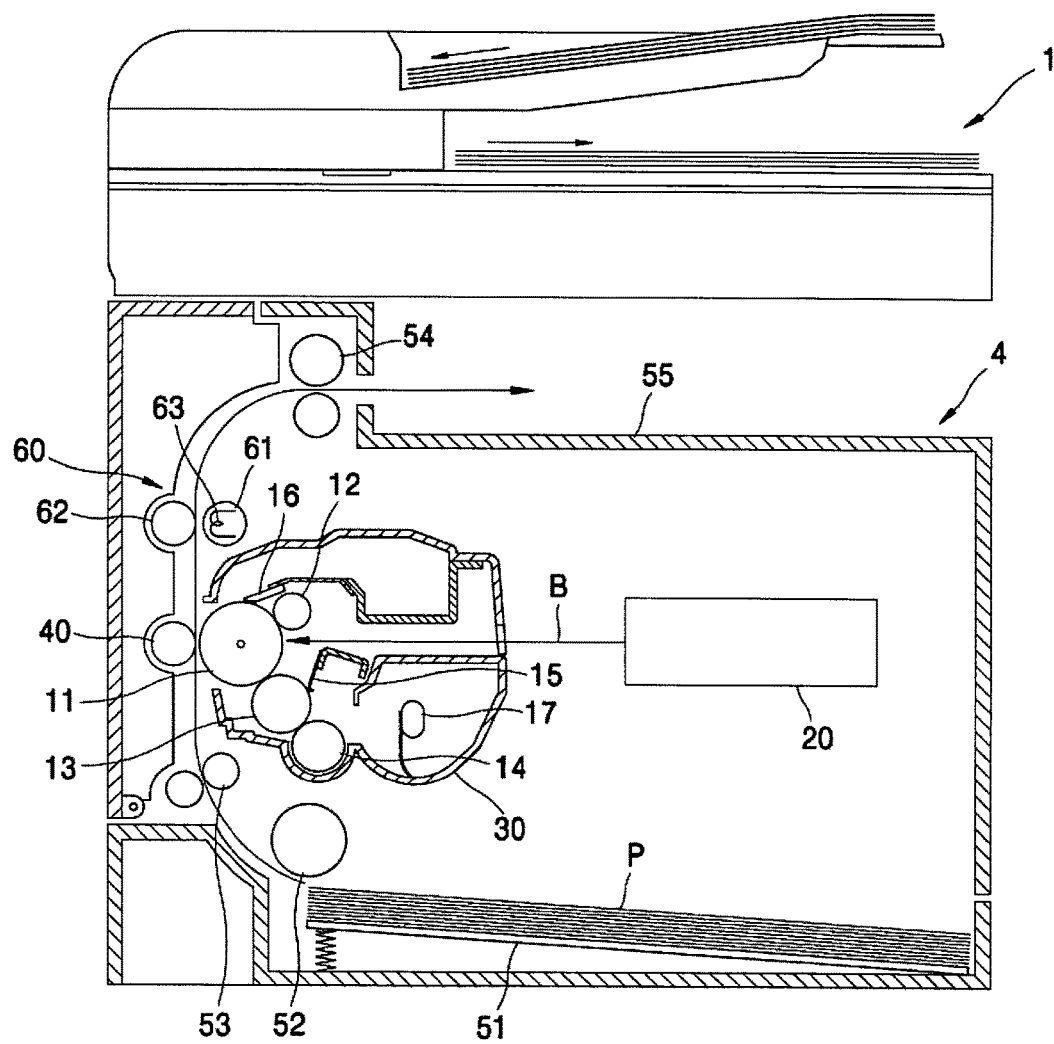
FIG. 12 is a diagram of an image forming apparatus employing a scanner apparatus, according to an embodiment.

The scanner apparatus 1 may be used solely or in a form of a multi-function apparatus in which the scanner apparatus 1 is combined with a copier or a printer including a printer that prints an image on paper. FIG. 12 is a diagram of an image forming apparatus employing the scanner apparatus 1, according to an embodiment. Referring to FIG. 12, the scanner apparatus 1 and a printer 4 are illustrated. The printer 4 according to the current embodiment is an electro-photographic printer that prints an image on paper via electro-photography. The scanner apparatus 1 is located above the printer 4. The scanner apparatus 1 may be the scanner apparatus 1 described above with reference to FIGS. 1 through 11. Hereinafter, an embodiment of the printer 4 will be described.

Referring to FIG. 12, the printer 4 may include a photoconductive drum 11, a charging roller 12, an exposure unit 20, a developing unit 30, and a transfer roller 40. The photoconductive drum 11 is an example of a photoconductor where an electrostatic latent image is formed, and may include a cylindrical pipe and a photoconductive layer formed around a cylindrical metal pipe and having photoconductivity. The charging roller 12 is an example of a charger that charges a surface of the photoconductive drum 11 in uniform electric potential. A charging bias voltage is applied to the charging roller 12. A corona charger (not shown) may be used instead of the charging roller 12.

The exposure unit 20 forms an electrostatic latent image by irradiating light B modulated according to image information onto the surface of the photoconductive drum 11 that is charged in uniform electric potential. A laser scanning unit (LSU) that irradiates light emitted from a laser diode onto the photoconductive drum 11 by deflecting the light in a main scanning direction by using a polygon mirror may be used as the exposure unit 20.

The developing unit 30 develops the electrostatic latent image formed on the photoconductive drum 11 by supplying toner. The toner is accommodated in the developing unit 30. A developing roller 13 is used to supply the toner to the electrostatic latent image formed on the surface of the photoconductive drum 11 to develop the electrostatic latent image to a visible toner image. According to the current embodiment, a non-contact developing method is used, and the surface of the developing roller 13 is separated from the surface of the photoconductive drum 11 by an interval of about hundreds of microns. Such an interval is referred to as a development gap. When a developing bias voltage is applied to the developing roller 13, the toner moves and adheres to the electrostatic latent image formed on the surface of the photoconductive drum 11, through the development gap. When a contact developing method is used, the developing roller 13 contacts the photoconductive drum 11. A supply roller 14 may be further provided to the developing unit 30 so as to adhere the toner to the developing roller 13. A supply bias voltage may be applied to the supply roller 14 so as to adhere the toner to the developing roller 13. A reference numeral 15 denotes a regulator for regulating an amount of toner adhered to the surface of the developing roller 13. The regulator 15 may be a regulating blade having a front end contacting the developing roller 13 at certain pressure. A reference numeral 16 denotes a cleaning member for removing remaining toner and impurities from the surface of the photoconductive drum 11 before charging. The cleaning member 16 may be a cleaning blade having a front end contacting the surface of the photoconductive drum 11. An agitator 17 transfers toner to the developing roller 13. The agitator 17 may also stir the toner to charge the toner to certain electric potential.

The transfer roller 40 is an example of a transfer unit that faces the surface of the photoconductive drum 11 to form a transfer nip. A transfer bias voltage for transferring the toner image developed on the surface of the photoconductive drum 11 on a recording medium P is applied to the transfer roller 40. A coroner transfer unit may be used instead of the transfer roller 40.

The recording medium P on which an image is to be printed is taken from a paper feeding cassette 51 by a pickup roller 52. The taken recording medium P is supplied to a region where the transfer roller 40 and the photoconductive drum 11 face each other, by a feed roller 53. The toner image on the surface of the photoconductive drum 11 is transferred to a surface of the recording medium P by a transfer bias voltage applied to the transfer roller 40, and is maintained on the surface of the recording medium P by electrostatic attraction.

A fusing unit 60 forms a permanent print image on the recording medium P by fusing the toner image on the recording medium P by applying heat and pressure. The fusing unit 60 may be formed as a heating roller 61 including a heating unit 63 and a pressurizing roller 62 are engaged together to form a fusing nip. The recording medium P that has passed through the fusing unit 60 is discharged to a discharging tray 55 by a discharging roller 54.

Such an image forming apparatus may perform printing, copying, and reading operations. The printing operation is an operation of printing an image on paper based on image information received from an external host (not shown). The copying operation is an operation of reading image information from the document D by using the scanning apparatus 1 and transmitting the image information to the printer 4 to print an image on paper. The reading operation is an operation of reading image information from the document D, and for example, the read image information may be transmitted to a host (not shown). When a communication unit (not shown) is provided, the image forming apparatus may also perform a facsimile transmitting function of transmitting the read image information by using a communication line, such as a telephone line, and a facsimile receiving function of printing image information received through a telephone line or the like by using the printer 4.

In the above embodiment, the monochromatic electro-photographic printer 4 including one developing unit 30 has been described, but an embodiment is not limited thereto. When the printer 4 uses color electro-photography, the printer 4 may include four developing unit 30 respectively accommodating cyan toner, magenta toner, yellow toner, and black toner. Also, the printer 4 may use any other image forming method, such as an inkjet method or a thermal-transfer method.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been shown and described with reference to the figures, it will be understood by those of ordinary skill in the art that various changes in form and details may be made therein without departing from the principles and spirit of the disclosure, the scope of which is defined by the following claims and their equivalents.

What is claimed is:

1. A scanner apparatus, comprising:
   a document feeding path in which a reading device to read an image from a document is provided;
   a first registration roller to feed the document along the document feeding path, and located at an upstream side of the reading device based on a feeding direction of the document;
   a second registration roller aligned with the first registration roller in a width direction of the document, and disposed spaced apart from the first registration roller in the width direction;
   a registration motor to drive the first registration roller independently of the second registration roller; and
   a main motor to drive the second registration roller independently of the first registration roller.

2. The scanner apparatus of claim 1, wherein end portions of the first and second registration rollers, which are adjacent to each other, are connected to each other through a bearing.

3. The scanner apparatus of claim 2, further comprising a bearing holder fixed to one of the end portions of the first and second registration rollers and by which the bearing is supported,
   wherein the other end portion of the first and second registration rollers is supported by the bearing.

4. The scanner apparatus of claim 1, further comprising:
   a first support to support a first end portion of the first registration roller; and
   a second support to support a second end portion of the second registration roller,
   wherein the first end portion and the second end portion are disposed adjacent to each other.

5. The scanner apparatus of claim 1, further comprising a document feeding roller to feed the document along the document feeding path,
   wherein the main motor is to drive the document feeding roller.

6. A scanner apparatus, comprising:
   a document feeding path in which a reading device to read an image from a document is provided;
   a first registration roller to feed the document along the document feeding path, and located at an upstream side of the reading device based on a feeding direction of the document;
   a second registration roller aligned with the first registration roller in a width direction of the document, and disposed spaced apart from the first registration roller in the width direction;
   a registration motor to drive the first registration roller;
   a main motor to drive the second registration roller;
   a registration sensor to detect the document, the registration sensor comprising a first registration sensor disposed at a downstream side of the first registration roller and a second registration sensor disposed at a downstream side of the second registration roller; and
   a controller to detect a front end skew amount of the document from a detection time deviation of a front end of the document, based on the detection of the document by the first and second registration sensors.

7. The scanner apparatus of claim 6, wherein the controller is further to drive the main motor and the registration motor at a constant speed such that a rotation linear speed of the first and second registration rollers is equal to a process speed, and change a speed of the registration motor such that the front end skew amount is corrected, after the front end of the document is detected by the first and second registration sensors.

8. The scanner apparatus of claim 7, wherein the controller is further to drive the registration motor at a reference speed such that the rotation linear speed of the first registration roller is equal to the process speed, after the front end skew amount of the document is corrected.

9. The scanner apparatus of claim 7, wherein the controller is further to detect a rear end skew amount of the document from a detection time deviation of a rear end of the document, based on the detection of the document by the first and second registration sensors, calculate a new reference speed based on the rear end skew amount, and drive the registration motor based on the new reference speed.

10. The scanner apparatus of claim 1, wherein the main motor comprises a brushless direct current (BLDC) motor.

11. The scanner apparatus of claim 1, wherein the registration motor is any one of a stepping motor, a direct current (DC) motor, and an inner-rotor type BLDC motor.

12. An image forming apparatus, comprising:
    a printer to form an image on a recording medium; and a scanner apparatus, comprising:
  a document feeding path in which a reading device to read an image from a document is provided,
  a first registration roller to feed the document along the document feeding path, and located at an upstream side of the reading device based on a feeding direction of the document,
  a second registration roller aligned with the first registration roller in a width direction of the document, and disposed spaced apart from the first registration roller in the width direction,
  a registration motor to drive the first registration roller independently of the second registration roller, and
  a main motor to drive the second registration roller independently of the first registration roller.

13. The image forming apparatus of claim 12, wherein end portions of the first and second registration rollers of the scanner apparatus, which are adjacent to each other, are connected to each other through a bearing.

14. The image forming apparatus of claim 13, wherein the scanner apparatus further comprises a bearing holder fixed to one of the end portions of the first and second registration rollers and by which the bearing is supported,
  wherein the other end portion of the first and second registration rollers is supported by the bearing.

15. The image forming apparatus of claim 12, wherein the scanner apparatus further comprises:
  a first support to support a first end portion of the first registration roller; and
  a second support to support a second end portion of the second registration roller,
  wherein the first end portion and the second end portion are disposed adjacent to each other.

16. The image forming apparatus of claim 12, wherein the scanner apparatus further comprises a document feeding roller to feed the document along the document feeding path,
  wherein the main motor is to drive the document feeding roller.

17. An image forming apparatus, comprising:
  a printer to form an image on a recording medium; and
  a scanner apparatus, comprising:
    a document feeding path in which a reading device to read an image from a document is provided,
    a first registration roller to feed the document along the document feeding path, and located at an upstream side of the reading device based on a feeding direction of the document,
    a second registration roller aligned with the first registration roller in a width direction of the document, and disposed spaced apart from the first registration roller in the width direction,
    a registration motor to drive the first registration roller,
    a main motor to drive the second registration roller,
    a registration sensor to detect the document, the registration sensor comprising a first registration sensor at a downstream side of the first registration roller and a second registration sensor at a downstream side of the second registration roller, and
    a controller to detect a front end skew amount of the document from a detection time deviation of a front end of the document, based on the detection of the document by the first and second registration sensors.

18. A skew correction method, comprising:
  rotating, at a process speed, a first registration roller located at an upstream side of a reading device based on a feeding direction of a document, by using a registration motor;
  rotating, at the process speed, a second registration roller aligned with the first registration roller in a width direction of the document and spaced apart from the first registration roller in the width direction, by using a main motor;
  calculating a front end skew amount from a detection time deviation of a front end of the document based on a detection of the document by first and second registration sensors disposed at a downstream side of the first and second registration roller, respectively, and spaced apart from each other in the width direction; and
  correcting the front end skew amount by changing a speed of the registration motor.

19. The skew correction method of claim 18, further comprising, after the correcting of the front end skew amount, driving the registration motor at a reference speed such that the first registration roller is rotated at the process speed.

20. The skew correction method of claim 19, further comprising:
  calculating a rear end skew amount from a detection time deviation of a rear end of the document, based on the detection of the document by the first and second registration sensors;
  calculating a new reference speed for correcting the rear end skew amount; and
  driving the registration motor at the new reference speed.

* * * * *